R. T. BROWN.

Assignor, by mesne assignments, to the CLINTON WIRE CLOTH COMPANY.

FASTENING WIRE LATHING TO IRON FRAMES OF BUILDINGS.

No. 10,684. Reissued Feb. 9, 1886.

Witnesses:

H. E. Metcalf.

C. C. Shaw.

Inventor:

Robert T. Brown

N. PETERS, Photo-Lithographer, Washington, D. C.

UNITED STATES PATENT OFFICE.

ROBERT T. BROWN, OF BOSTON, ASSIGNOR, BY MESNE ASSIGNMENTS, TO THE CLINTON WIRE CLOTH COMPANY, OF CLINTON, MASSACHUSETTS.

FASTENING WIRE LATHING TO IRON FRAMES OF BUILDINGS.

SPECIFICATION forming part of Reissued Letters Patent No. 10,684, dated February 9, 1886.

Original No. 245,992, dated August 23, 1881. Application for reissue filed May 24, 1882. Serial No. 62,282.

*To all whom it may concern:*

Be it known that I, ROBERT T. BROWN, of Boston, in the county of Suffolk and State of Massachusetts, have invented certain new and useful Improvements in Devices for Fastening Wire Lathing to the Iron Frames of Buildings; and I do hereby declare that the following is a full, clear, and exact description of the invention, that will enable others skilled in the art to which it appertains to make and use the same, reference being had to the accompanying drawings, and to the letters of reference marked thereon, which form a part of this specification, and in which—

Figure 1:
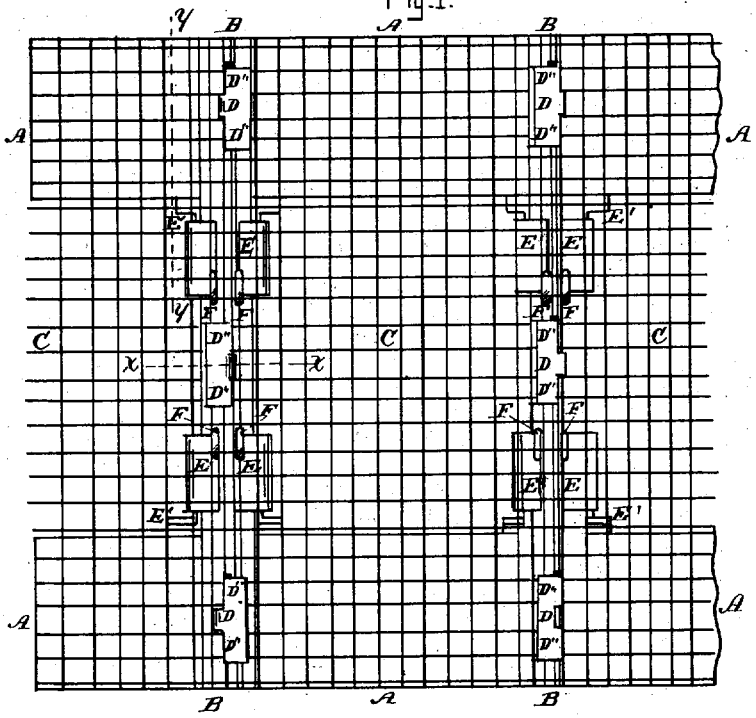
Figure 3:
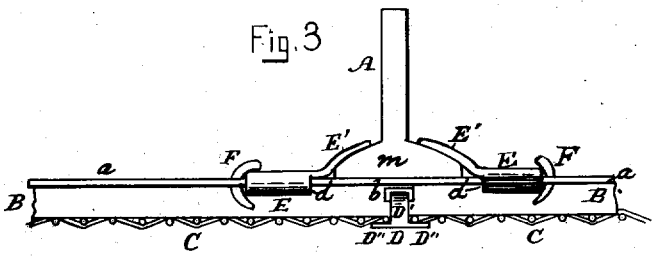
Figure 2:
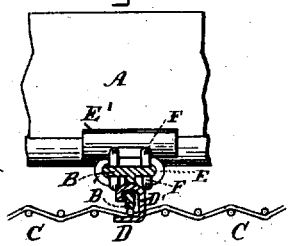

Figure 1 is a plan or bottom view representing the lathing attached or secured to the beams and in position for use; Fig. 2, a vertical transverse section taken on line *x x*, Fig. 1; Fig. 3, a transverse section taken on line *y y*, Fig. 1.

Like letters of reference indicate corresponding parts in the different figures of the drawings.

My improvement relates to means for attaching or securing the furring to the beams and the lathing to the furring; and it consists in a novel construction and arrangement of parts, as hereinafter more fully set forth and claimed, by which a more effective device of this character is produced than is now in ordinary use.

In the drawings, A represents the beam, B the furring, and C the lathing or cloth to which the plastering or cement is applied. The furring is preferably constructed of light T-iron, and arranged at a suitable angle to the beam, as the exigencies of the building may require, the cross or double flange *a* of the furring coming into contact with the lower side or face of the beam, and being secured thereto by the hangers or clamps E. (I have shown the furring in Fig. 3 as applied at a right angle to the beam for a level ceiling, but do not limit myself thereto.) These hangers or clamps are respectively provided with inwardly-curved flanges or lips *d d*, on each of their sides, which grasp the cross or flange *a* of the furring B, and with an upwardly curved or inclined flange or projection, E′, which extends over or hooks onto the cross or flange *m* of the beam A. The wire cloth or lathing C is secured to the furring by a series of T-shaped clamps or hangers, D, having the flat side flanges or wings, D″, the shanks or bodies D′ of the hangers, bent or curved, as seen in Fig. 2, passing up or in through the wire lathing and hooking into the holes *b* in the furring B, as shown in Fig. 3. The wings or flanges D″ of the hangers are preferably so constructed as to extend far enough from the shank or hook-shaped body D′ to overlap or cover two or more strands of the wire of which the lathing is formed, thus firmly locking or securing it to the furring.

In the use of my improvement, the beams A being in position, the hangers or clamps E are slipped onto or passed over the flange *a* of the furring B. The furring is then placed against the beam, as shown in Fig. 3, and the clamps pushed up against the beam on either side until the projections E′ overlap or hook onto the cross or flange *m*, in which position they are secured by the catches or stops F, inserted in the holes or perforations *x*, provided in the flange *a* for that purpose. After the furring is secured to the beam, as described, the lathing is attached to the furring by means of the clamps or hangers D. The end of the shank D′ should be slightly bent or curved before it is passed through the lathing, so as to readily enter the holes *b* in the furring, the bending of the shank to form a hook being completed after it is passed through said hole by means of pliers or any other convenient implement inserted through the meshes of the lathing. The wings D″, or head of the hanger D, stand at right angles to its body or shank D′, so as to lie flat on the lathing C when in use, and may be bent down to this angle before or after the shank of the hanger is passed through the lathing. It will be understood that the beams A, furring B, clamps or hangers D E, lathing C, and stops F are all designed to be composed of metal and fire-proof.

Having thus explained my improvement, what I claim is—

1. The furring B and hangers E, in combination with the beam A, substantially as specified.

2. The furring B, hangers E, and stops F, in combination with the beam A, substantially as set forth.

3. In a device for attaching wire lathing to the iron frames of buildings, the furring B, provided with the holes *b* and a clamp or hanger, D, in combination with the lathing C, substantially as described.

4. In a device for attaching wire lathing to the iron frames of buildings, the furring B, clamps or hangers E D, stops F, and lathing C, in combination with the beam A, substantially as specified.

5. The combination of a furring-strip provided with holes, wire lathing, and a T-shaped fastener, the shank of which is passed through the lathing on one side of the furring-strip, through the hole in said strip, and bent down on the opposite side of said strip, the head of said fastener being bent at an angle to the shank against the outer face of the lathing, substantially as described.

6. The combination of the beam A, the furring B, provided with the holes *b*, the clamps E, the lathing C, and the hangers D, the shanks of which are passed through the holes in the furring, substantially as described.

7. The combination of the beam A, the furring B, provided with holes *b*, the clamps E, stops F, the lathing C, and the hangers D, the shanks of which are passed through the holes in the furring, substantially as described.

In testimony that I claim the foregoing I have hereunto set my hand and seal this 18th day of May, 1882.

ROBERT T. BROWN.

Witnesses:

H. E. METCALF,

C. A. SHAW.